R. McCULLY.
Velocipede.

No. 87,275.                        Patented Feb. 23, 1869.

Witnesses:                        Inventor.
H. H. Young                       Robt. McCully
Wm. H. Rowe                    per
                                                   D. A. Burr atty.

ROBERT McCULLY, OF PHILADELPHIA, PENNSYLVANIA.

Letters Patent No. 87,275, dated February 23, 1869.

TOY

The Schedule referred to in these Letters Patent and making part of the same.

*To all whom it may concern:*

Be it known that I, ROBERT McCULLY, of Philadelphia, in the county of Philadelphia, and State of Pennsylvania, have invented an Improved Mechanical Toy; and I do hereby declare the following to be a full and exact description thereof, reference being had to the accompanying drawings, forming a part of this specification, in which—

Figure 1:
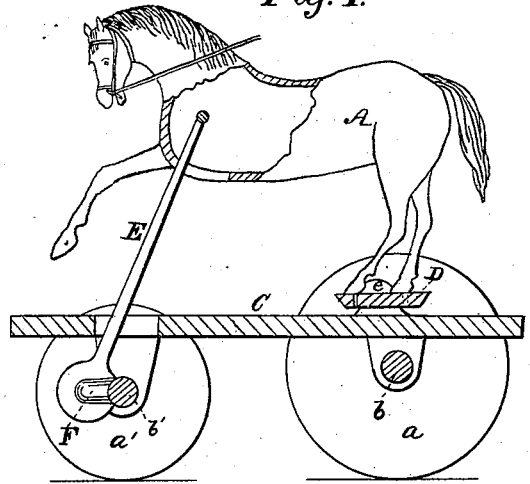
Figure 2:
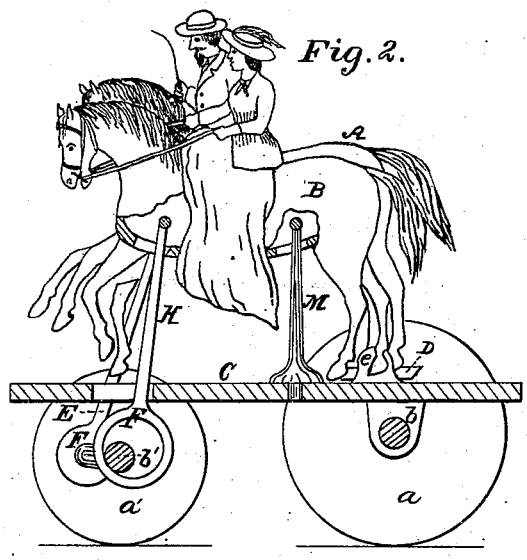

Figures 1 and 2 are side elevations, partially in section, of my invention, and

Figure 3:
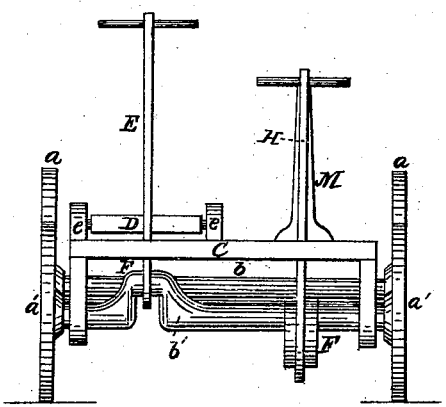

Figure 3, a front view of the toy illustrated in fig. 2, with the animals removed.

Like letters indicate like parts in all of the figures.

The nature of my invention consists in the combination of the representation of a horse, or other animal, pivoted upon a platform, or to a standard secured to a platform, with a crank or eccentric upon the axle of the front wheels, in such manner as that the rotation of the wheels shall impart a rocking motion to the animal, as hereinafter more fully described.

In the accompanying drawings—

A and B represent, in outlines, a toy-horse and rider.

C, a platform, mounted upon four wheels, $a\ a\ a'\ a'$, secured to suitable axles, $b\ b'$, so as to revolve therewith.

The horse, A, fig. 1, is secured by its hind legs upon a bar or plate, D, pivoted between lugs, or ears, $e\ e$, figs. 1 and 3, projecting from the platform C.

One end of a link or arm, E, is also pivoted centrally within the body of the horse, at a point just back of the fore quarter or front legs, and it extends down through a slot in the horse, and a second slot, in the platform, to the front axle $b'$, where it is pivoted to a crank or eccentric, F, upon the axle, so that the revolutions thereof shall cause a rocking movement of the animal upon its pivot at $c\ c$.

The horse B, fig. 2, is also provided with a link or arm, H, passing through a slot in the platform C, and pivoted centrally in its body, just in the rear of its front legs above, and to an eccentric, or cam, F', upon the front axle below, (see fig. 2;) but it is pivoted at a point just in front of its hind legs or hind quarter, by means of a pivot-pin, $i$, inserted centrally through its body, passing through the upper end of a standard, M, secured to the platform C, and passing up through a slot into the body of the horse.

As the motion is in each case, A and B, obtained similarly from the front axle, and differs in each animal only because of the change in the position of the fixed pivot-point therein, I propose to combine the two horses A and B upon the same platform, with the same axle, $b'$, as illustrated in figs. 2 and 3, and thus, by contrasting the difference of movement in the two horses, afford a pleasing variety, enhancing the amusing interest of the toy.

I contemplate, however, also manufacturing each horse with its own peculiar movement, as described, separately, upon a distinct platform and wheels.

In either case, I propose to combine with the platform and wheels suitable clock-work, or spring-actuated gearing, concealed under or upon the platform, and connected with one of the axles, so as to propel the toy, although such expensive clock-work and spring-attachment may be dispensed with, as shown in the drawings, and the toy be drawn forward simply by a cord fastened thereto.

The horses or other animals may of course be made of various models, and with or without riders, and may be carved of wood, or cast or formed of metal or other material.

Having thus fully described my invention,

I claim as new, and desire to secure by Letters Patent—

As a toy, the model of a horse or other quadruped A, pivoted at its hind legs to a platform on wheels C, when combined with a cam, or eccentric, upon the front axle, by means of a connecting-link, pivoted centrally in its body, at or near its front legs, all substantially in the manner herein described.

Also, the model of a horse, or other quadruped, B, pivoted at a central point within its body, in front of its hind legs, to a standard projecting from a platform, C, on wheels, when combined with a cam, or eccentric, upon the front axle, by means of an intermediate link, pivoted centrally in its body, at or near its front legs, substantially in the manner as herein described.

The foregoing specification of my improved mechanical toy signed by me, this 21st day of January, 1869.

ROB'T McCULLY.

Witnesses:
DAVID A. BURR,
WM. H. ROWE.